United States Patent
Kay

(10) Patent No.: US 8,947,227 B2
(45) Date of Patent: Feb. 3, 2015

(54) PASSIVE DEVICE SHIELD WITH PROXIMITY CHANGE ALERT

(75) Inventor: Andre Kay, Gwynedd (GB)

(73) Assignee: VoyagerBlue Ltd, Anglesey, Gwynedd (GB)

( * ) Notice: Subject to any disclaimer, the term of this patent is extended or adjusted under 35 U.S.C. 154(b) by 211 days.

(21) Appl. No.: 13/639,353

(22) PCT Filed: Apr. 5, 2011

(86) PCT No.: PCT/GB2011/050676
§ 371 (c)(1),
(2), (4) Date: Oct. 4, 2012

(87) PCT Pub. No.: WO2011/124911
PCT Pub. Date: Oct. 13, 2011

(65) Prior Publication Data
US 2013/0307687 A1 Nov. 21, 2013

(30) Foreign Application Priority Data
Apr. 6, 2010 (GB) .................................. 1005743.8

(51) Int. Cl.
*G08B 1/08* (2006.01)
*G08B 21/18* (2006.01)
(Continued)

(52) U.S. Cl.
CPC .............. *G08B 21/18* (2013.01); *G06K 19/025* (2013.01); *G06K 19/07327* (2013.01);
(Continued)

(58) Field of Classification Search
CPC combination set(s) only.
See application file for complete search history.

(56) References Cited

U.S. PATENT DOCUMENTS 5,396,218 A 3/1995 Olah
5,781,109 A * 7/1998 Nakajima .................... 340/571
(Continued)

FOREIGN PATENT DOCUMENTS

GB 2453859 4/2009
WO 2006005984 A1 1/2006

OTHER PUBLICATIONS

GB Search Report GB1105734.6, Jul. 13, 2011.
(Continued)

*Primary Examiner* — Travis Hunnings
(74) *Attorney, Agent, or Firm* — Quarles & Brady LLP; Gavin J. Milczarek-Desai

(57) ABSTRACT

A method of making a fuel for a portable heater comprises heating a salt of iron with a carboxylic acid at a temperature from about 400° C. to about 700° C. under an inert or reducing atmosphere to produce a composite material comprising carbon and iron nanoparticles. The fuel may be mounted to a substrate, such as a mesh or foil, and incorporated into a self-heating packaging. Typically, the packaging comprises a wall defining a chamber that, in use, contains a substance to be heated, e.g. a food-stuff or liquid. A heating manifold in thermal communication with the chamber contains the fuel in the inert atmosphere to initially inhibit production of heat otherwise arising from substantial oxidation of substantially all the fuel in the manifold in an exothermic reaction. A vent in the manifold is initially sealed and air-tight, but selectively opening of the vent allows oxidation of the iron nanoparticles. The chamber is then heated by the transfer of heat from the fuel to the chamber, the transfer of heat being by at least one of direct thermal conduction through the wall, thermal convection or indirect thermal heating arising from heating of a fluid medium that is introduced into the chamber.

20 Claims, 1 Drawing Sheet

(51) Int. Cl.
*G06K 19/02* (2006.01)
*G06K 19/073* (2006.01)
*G06K 19/077* (2006.01)
*G08B 13/14* (2006.01)
*H04K 3/00* (2006.01)
*G06K 17/00* (2006.01)

(52) U.S. Cl.
CPC ..... *G06K 19/07728* (2013.01); *G08B 13/1427* (2013.01); *H04K 3/28* (2013.01); *H04K 3/68* (2013.01); *H04K 3/86* (2013.01); *H04K 3/226* (2013.01); *G06K 2017/0045* (2013.01); *H04K 2203/20* (2013.01)
USPC .................. 340/539.13; 340/572.1; 340/505; 340/10.1

(56) References Cited

U.S. PATENT DOCUMENTS

| | | | |
|---|---|---|---|
| 6,876,301 B1 * | 4/2005 | Ray et al. | 340/571 |
| 2002/0108704 A1 | 8/2002 | Umezawa et al. | |
| 2004/0246129 A1 | 12/2004 | Goggin | |
| 2005/0104729 A1 * | 5/2005 | Grant | 340/568.7 |
| 2006/0290501 A1 * | 12/2006 | Hammad et al. | 340/572.1 |
| 2008/0252453 A1 * | 10/2008 | Hallberg | 340/571 |
| 2009/0146814 A1 * | 6/2009 | Hammad et al. | 340/572.1 |
| 2009/0273450 A1 | 11/2009 | Moran | |

OTHER PUBLICATIONS

International Search Report, PCT/GB2011/050676, Jul. 2009.

* cited by examiner

PASSIVE DEVICE SHIELD WITH PROXIMITY CHANGE ALERT

The present invention relates to a passive device shield which is used to prevent unauthorized reading of electronic, machine readable chips and in particular to a shield with a device for alerting a proximity change beyond a predetermined distance.

Devices containing data on an embedded passive chip contain no energy source such as a battery. To read the data the chip is energized by an external energy source and the data is readable using active coupling. This method provides both energy and an effective pipeline through which the data can travel. The reader is usually a radio frequency identification reader (RFID) which usually operates at 13.56 $MH_z$. The type of data stored is often personal details such as biometric data for example fingerprint, iris or facial template all could be used in biometric recognition at a variety of security check points including immigration border points, and details such as nationality, document number, date of birth, date of issue and expiry etc. The devices can be in the form of documents that contain such data and include machine readable travel documents (MRTD) which includes passports, visas and national ID cards, tickets, and also payment cards, security passes etc. Such devices also includes Near Field Communications (NFC) enabled devices, such as NFC enabled mobile phones, which can also be used as electronic money, travel cards, identity documents, electronic keys, electronic ticketing, credit cards etc.

Whilst machine readable documents enable authorized persons to read the information contained on the chip quickly and with greater detail than before, such chips because they are read remotely could enable unauthorized persons with a suitable reader to access the information remotely without the document holder's knowledge. This can lead to theft of detailed personal information or money which could be utilised by terrorists and criminals.

In order to try and prevent remote scanning of a document, a removable document shield has been developed (GB 2453859 Orb Information Technology Limited) constructed of a material adapted to provide radio frequency shielding at the reading frequency in order to prevent unauthorised scanning of the data on the chip when the shield is for example inserted between the pages of a passport. The shield is simply removed when it is necessary to access the data.

The shield provides a good protection of the data when it is present. However, if the document protected becomes separated from the user, not only will this cause significant inconvenience, but because if it is stolen or simply mislaid, then it is possible for an unauthorised person to obtain the device, remove the shield and potentially read the data or steal money.

It is an object of the present invention to provide means to overcome or alleviate these disadvantages.

In accordance with the present invention, there is provided a passive device shield and a receiver remotely coupled to the shield, the shield being adapted to provide radio frequency shielding to block selected radio frequencies, the shield further comprising a transmitter to send a coupling signal to the receiver, the coupling signal being of at least one non-blocked frequency, the receiver and or transmitter having means to monitor the distance between the receiver and transmitter and an alert means to indicate when the measured distance exceeds a predetermined value.

This has the advantage that when the shield is used to protect a passive chip containing data from remote skimming at a frequency which activates the chip to send the data, the shield blocks such activation frequencies. The alert means can be used to indicate when the shield and therefore the protected chip becomes separated from the owner by more than a predetermined distance. Therefore, if the machine readable document containing a chip protected by the shield is stolen, or mislaid, alerting the user enables faster recovery and eliminates or reduces the shield being removed and the data read by an unauthorised third party. The provision of a certain distance before activation of the alert enables the device containing the passive chip to be examined and read by authorised personnel in the vicinity of the owner, once the shield has been removed.

In a preferred embodiment the shield is removable. Although in a preferred embodiment the transmitter sending the coupling signal is used with a removal shield, the proximity alert/monitoring provided could also be used in combination with a fixed shield, for example one incorporated in the fabric of a passport. If the shield is provided on a different page or cover from that of the passive chip to be read, the shield can be moved away from the chip simply by opening the passport.

At least one of the transmitter or receiver may have means to adjust the predetermined value. This has the advantage that the user can select a preferred maximum distance between the receiver and shield. The transmitter may have means to act as a locating device to search for the shield and provide an alert signal when in range.

The receiver may have means to selectively deactivate the coupling. This enables the receiver to be switched off when it is not required to monitor the position of the shield, or if it is necessary to switch the receiver off, for example when the user is in the vicinity of sensitive equipment which may be affected by the receiver, it then being necessary to switch off electrical equipment for example when a plane is landing or taking off.

The alert means may comprise an indication of at least one of time and date that the predetermined distance was exceeded. This enables the user to determine when the shield and receiver become separated and therefore enables them to determine where the shield could be located, for example, in a wash room in the back of a plane seat, left at a check-in desk etc.

The receiver may have means to search for the shield in order to pair the receiver with the transmitter. The receiver may have additional means to activate the alert signal if the transmitter cannot be found. The receiver may have means to indicate the last time the shield and receiver were paired.

The alert signal may comprise at least one of a vibrating alert, a sound alert, and a visual alert. The alert may increase in pitch and volume over time.

The document shield may be provided with a stiffner, at least in the vicinity of the transmitter. This has the advantage of preventing the transmitter from being flexed and damaged. It has the further advantage of providing protection to the passive chip embedded in a machine readable device from possible damage via flexing thereof.

The stiffner may be in the form of a coating to the shield, the coating may be in the form of at least one laminated surface.

The laminated surface may have a thickness of at least 400 microns.

The shield provides the shielding by the provision of a shielding layer, the shield may have a further thin surface provided on the shielding layer, the further thin layer enabling the provision of printed messages on the document shield. This enables logos, advertising, operating instructions etc. to be provided on the shield. The further layer may be provided under the stuffer, the stiffner being at least partially transparent. This enables additional protection of the printed layer.

The transmitter may be embedded in the shield. This provides further protection to the transmitter from accidental damage. The transmitter may be provided with a permanent power source. The power source may be rechargeable.

The predetermined value is between 3 to 100 meters, more preferably 3 to 7 meters.

The receiver may be incorporated in a mobile phone. This has the advantage that most people carry phones and it therefore not being necessary to carry an additional receiver. To this end the mobile phone could be provided with an application specifically developed to pair with the proximity alert transmitter.

The receiver may have means to detect signals from a plurality of coupled transmitters. This has the advantage that a number of shields can be monitored by a single receiver, for example the receiver of a responsible adult travelling with their family, enabling monitoring of the location of, for example, their child's passport.

The coupling signal may be in the form of at least one of a radio frequency signal, a blue tooth signal, low-powered blue tooth signal and wifi signal.

The transmitter may be low powered.

The receiver may have means to indicate the presence of the transmitter when in range, thereby ensuring the user that the device is working properly.

The shield may have means to enable information to be stored thereon. The information means may be in the form of a printable layer. The printable layer may be re-printed. The layer may be in the form of a thermoplastics layer. The information means may be in the form of a writable memory. The memory may be rewritable.

In a preferred embodiment, the information means is adapted to enable the shield to be used as at least one of a boarding pass and frequent flier card, identity document.

A further receiver may be provided adapted to read the coupling signal of the transmitter and which enables identification of the shield.

The further receiver may have means to link the transmitter whose coupling signal it reads to an identification pass and means to provide details of that pass to the shield. The pass may be in the form of a boarding card, the boarding card may be provided on the shield by printing.

A plurality of such further receivers may be provided which are linked in a network and have means to track the location of the shield. The network of receivers may have means to enable the identification and tracking of a plurality of different transmitters.

The network may have means to activate the tracking and location of a particular shield transmitter. The activation means may be activated when a particular shield has not been presented for inspection within a set period of time.

In accordance with a second aspect of the present invention, there is provided a method of tracking a passive device shield, the shield being adapted to provide radio frequency shielding to block selected radio frequencies, the shield comprising a transmitter adapted to transmit a unique signal, the signal being of a non-blocked frequency, the method comprising providing a network of receivers adapted to identify and locate the unique signal.

The method may further comprise the step of printing a boarding pass onto the shield and pairing the unique signal of its transmitter with the boarding pass.

The method further comprises adapting the network to track and locate the boarding pass when the receiver is paired with the boarding card. The method may track and locate the boarding pass when the boarding pass has not been presented for inspection as required.

The shield may comprise a shield of sheet of material and may incorporate a fabric layer having a maximum thickness of 0.4 mm and being constructed of a material adapted to provide radio frequency shielding with an attenuation of at least 50 dB.

In a preferred embodiment said shield has a maximum thickness of 0.1 mm and an attenuation of at least 93 dB.

The material may include at least one of a conductive material, a non-magnetic material and a material with a low bulk resistance.

The resistivity value may be in the range of 1.5 micro-ohm-meters to 6 micron-ohm-meters.

The material may include at least one paramagnetic or diamagnetic component.

The material may comprise at least one of Platinum, Aluminium, Copper, Silver, Gold and Nickel.

The material may comprise at least one woven fabric, which may be plastics and may be nylon.

In a preferred embodiment the material comprises a woven fabric with at least one metallic layer. The material may be laminated. The material may comprise an anti-slip finish.

In a preferred embodiment the shield is specifically adapted to shield frequencies of 13.56 MHz.

In a preferred embodiment the shield comprises at least a combination of three metals, which may be Nickel, Copper and Silver which may be provided on a woven fabric. The metals may be provided in layers.

In a further preferred embodiment a document is provided in the form of a book having a cover and/or several pages, the book comprising at least one microchip embedded in at least one of the pages and/or cover, the microchip containing data which can be read when the chip is energized using a radio frequency identification reader, wherein the shield is removable and is adapted to be slipped between adjacent pages and/or cover of the book.

The book may be a passport.

The shield may comprise means to provide releasable adhesion to at least an item to be shielded thereby. The means may comprise a re-adherable low-tack adhesive on at least a portion of the shield's surface. The adhesive may be adapted to leave no substantial residue on the item and may be adapted to retain substantially no matter from the item to which it adheres. This has the advantage that the shield can adhere to, for example, the page in which the chip is embedded, therefore is in close proximity to the chip and therefore even if the passport is open it prevents reading of the data until the user physically removes the shield. Thus preventing skimming if, for example, the document or passport opens slightly in a bag or pocket.

The removable shield may be substantially the same size as a cover or page of the book. A tab may be provided on the shield, which extends out of the book. The tab enabling the shield to be more easily removed from the book.

By way of example only, specific embodiments of the invention will now be described, with reference to the accompanying drawings, in which.

Figure 1:
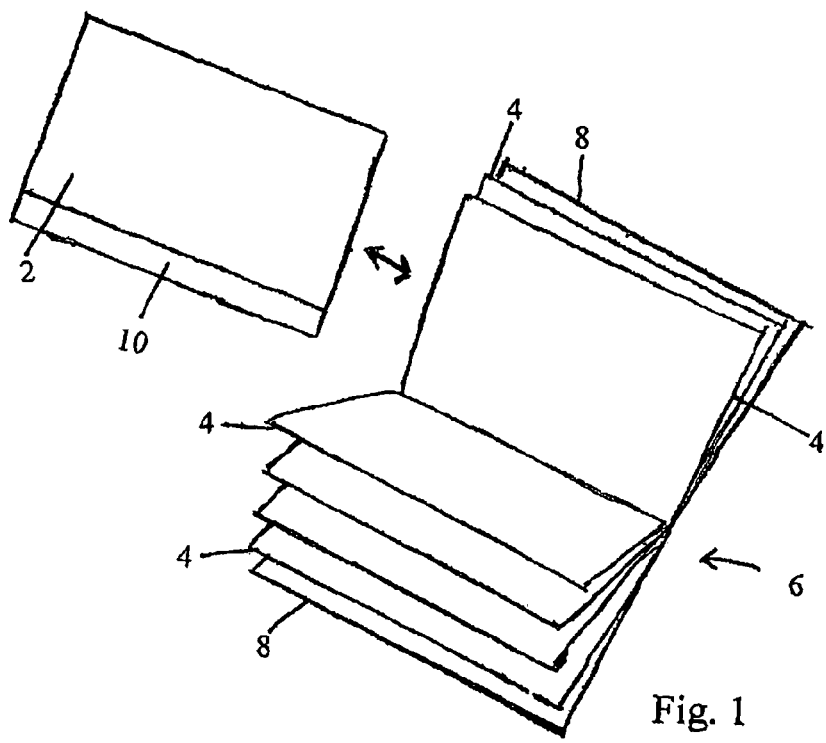
FIG. 1 is a perspective view of a passport and passive device shield which is constructed in accordance with one embodiment of the present invention.
Figure 2:
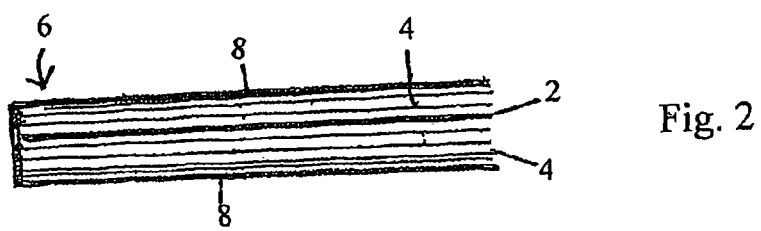
FIG. 2 is a schematic side view of the passport with the shield of FIG. 1 inserted therein and the passport closed.

In a first embodiment of document shield 2, as illustrated in the drawings, the passive device shield 2 comprises a sheet of substantially rectangular material adapted to be inserted between two adjacent pages 4 of a book 6. The book 6 is a machine readable document comprising a number of bound pages 4 enclosed in an outer cover 8. The book 6 comprises information on at least one microchip (not illustrated) embedded in one or more of its pages 4 and/or cover 8. The or each microchip is a radio frequency identification chip (RFID) and an antenna is also embedded to enable the exchange of data. The microchip comprises data which is able to be read remotely by a suitable radio frequency (RF) reader (not illustrated), when the reader transmits a RF signal which activates and powers the chip and thus enables the exchange of data between the reader and the chip. The shield also has means to enable a proximity alert or tracking means which will be described further herein under.

The shield 2 is formed of a material which blocks radio frequency (RF) signals, in short one or more anti-skimming materials.

The shield 2, in the illustrated embodiment has approximately the same dimensions as the page of the illustrated book and a thickness similar to the thickness of a page of the book. By inserting the shield 2 into the book 6, between adjacent pages 4 it blocks the RF signal of the reader and thus prevents activation of the chip and thereby prevents data exchange and the reading of the information contained on the microchip. Removing the shield 2 from the book 6, allows activation of the chip and thus the exchange of data enabling the data to be read.

The material selected for the shield should achieve an attenuation of greater than 50 dB to achieve an effective shield to prevent reading of the data.

Furthermore, the shield should achieve desirable mechanical properties to extend its longevity, namely:
  adequate tensile strength to withstand folding, cutting, moulding;
  adequate tear strength to avoid tearing, splitting;
  adequate bursting strength under pressure and bending in multiple directions;
  adequate elastic properties to withstand stretching, folding without cracking and splitting breakage;
  adequate wear/abrasion resistance including resistance to piling.

Tests were conducted using an e-passport having a front cover thickness of 0.85 mm, a rear cover thickness of 0.83 mm and a page thickness of 0.10 mm, in order to find a suitable material or combination of materials to construct a shield having the desired properties. This passport contained a RFID chip and an OCR data page, which it was necessary to read and decipher before accessing the data in the chip. The tests were carried out using layers of various shielding materials placed either in the book or over the cover of the book and read at various distances using a Radio Frequency Identification Receiver (RFID) in order to determine the shielding effect thereof.

To achieve suitable RF attenuation of say greater than 50 dB it was found that the material should be a good conductor, whereby neither the electric or magnetic field penetrates too far, typically having a bulk resistivity value of between 1.5 micro-ohm-meters to 6 micro-ohm-meters. Also ideally the materials are non-magnetic, slightly paramagnetic or slightly diamagnetic of low relative permeability (order of approximately 1). Suitable materials including Silver, Copper, Platinum, Aluminium and Gold.

For example the following minimum values of thickness of materials was found to be necessary to prevent reading of the data:

| | |
|---|---|
| Aluminium | 0.02225 mm |
| Copper | 0.01768 mm |
| Silver | 0.01723 mm |

The selected attenuating material was then coated onto a woven material to achieve the required mechanical properties and the coated woven material laminated or surface modified 12 on both sides with surface modifier to provide a good feel, and improved appearance, durability, protection, and stiffening of the shield. The surface modifier providing an anti-slip finish to enable better retention of the shield within the book, thereby inhibiting the ability of the product to slide over the surface of the book. The surface modifier may take the form of an aqueous paste screen printed on the surface of the shield, the paste being a combination of synthetic dispersions, thickener and additives. The surface modifier may also take the form of a permanent adhesive layer applied to the back surface of the shield with the opposite surface being a semi-permanent adhesive layer of approximately 80 microns, for temporary adhesion to, for example, a book, passport or other machine readable document at a strength of approximately 1 newton.

Various woven materials can be used. However, nylon was found to have particularly good properties being a relatively good conductor. Other materials include other plastics and conductive rubber.

In a preferred embodiment the shield is formed from a woven fabric coated with highly conductive layers of three separate metals 14 of Silver, Copper and Nickel to provide a material of low bulk resistance being non-magnetic and providing a shielding effect of up to 97% at 13.56 $MH_z$, the wavelength used to read the documents. Thus making it impossible to penetrate using a covert or official reader. This combination is produced in a fabric having a shielding layer with total thickness of 0.1 mm, and having an attenuation rate of 93 dB.

The shield can be easily removed from the book at the time of reading by an official and unlike a fixed shield causes no interference, enabling the electronic data and optical data to be easily read. Simply slipping the shield into and out of the book provides a simpler solution than placing the book into a bag and is therefore more likely to be used by the owner. Furthermore, the slim nature of the shield has little impact on the overall thickness of the book. Furthermore, the shield could be inserted into the book when shipping from the issuing agency, preventing data theft whilst in transit.

Although the shield has been described as an insert into a book, the shield could be placed by the side of the book in the user's book holder or pocket, or could be used to protect other items such as payment cards, identity cards, NFC enabled devices such as mobile phones by placing it into a wallet, bag or purse alongside the items to be protected. The wallet, purse, bag or item of clothing could be adapted to provide a receptacle or pocket for the receipt of identity documents or documents with a passive chip containing data. The pocket providing means to also accommodate the shield therein, or with the shield being incorporated within the fabric of the pocket. This enables shielding and proximity alert of the items protected. This can be used for example to protect identity passes of personnel from remote skimming or provided a handy receptacle in a travel bag, handbag, attaché case, rucksack etc. for items that require shielding.

The shield and proximity alert device could be inserted into a small belt or loop to enable it to be wrapped around a NFC enabled mobile phone, a number of passports or identity documents provided in a stack thereby providing protection for several documents, the loop could be provided with a fastening to enable it to be wrapped round the stack, for example Velcro™ or a hoop and loop fastening.

Also the shield may be provided with a re-adherable strip of low-tack adhesive 10 enabling temporary attachment of the shield to a page of a book. In order to releasably attach the shield to the book, book holder etc. the adhesive 10 is such that the shield can be attached and not slip out when the book is handled, but is such that it can be easily removed by the user by gentle peeling from the item to which it is adhered, thus preventing the shield accidentally slipping from the item. Also when attached to paper/cotton the paper or cotton fibres can adhere to the adhesive and eventually block the adhesives action, the adhesive 10 is therefore adapted to be substantially resistant to accumulating such fibres, thus prolonging the life of the adhereability of the shield. Also the adhesive 10 is adapted to leave no substantial residue on the item to which it is adapted to adhere, hence preventing the build up of a residue which could degrade security features and prevent them being machine read. A combination of hot cure printing pastes and dispersion adhesive-systems on an aqueous base was formulated as being particularly suitable to provide a releasable adhesive means for the shield. An example of a suitable adhesive coating is one which presents a multitude of adhesive points applied to the shield such a system is available, for example, is the Gecko™ coating produced by the Rudolf Group which adheres without leaving a sticky residue. Although a strip of adhesive has been described, the adhesive could be provided in other configurations, for example dots. Although an adhesive could be used other forms of temporary adhesion could be employed.

Figure 3:
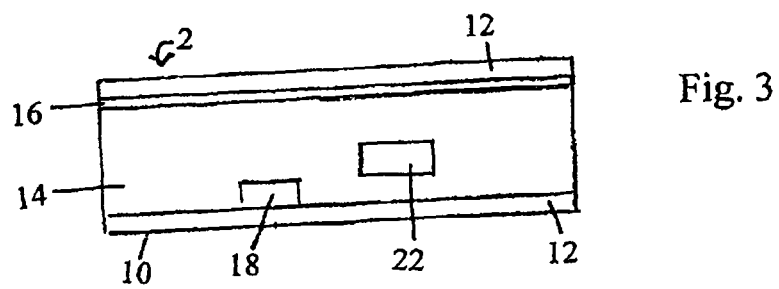
FIG. 3 is a cross-sectional schematic view of the shield of FIGS. 1 and 2.

As best illustrated in FIG. 3, the shield is additionally provided with a thin layer 16 printed, laminated or coated onto the metalized layer 14. The thin layer 16 is in the form of a thin vinyl layer comprising high gloss PVC approximately 80 microns with any base colour adapted to enable printing on the surface thereof.

As best illustrated in FIG. 3, the proximity alert means is provided as follows: a transmitter 18 is additionally located in the shield, the transmitter 18 being provided with a permanent battery and adapted to transmit at least one signal at a frequency different from those blocked by the shield. The battery may be rechargeable.

Figure 4:
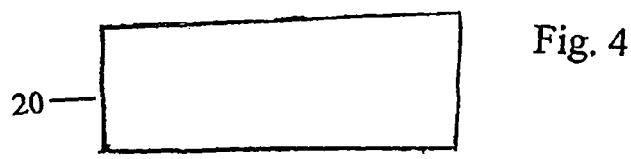
FIG. 4 is a schematic view of a receiver for use with the passive device shield.

As best illustrated in FIG. 4, a receiver 20 is provided and acts as a proximity detector. The receiver 20 receives the at least one signal from the transmitter 18 and has means to determine the proximity of the transmitter from the receiver. The receiver 20 further has alert means coupled to the proximity means (not illustrated), which is activated when the distance between the receiver 20 and transmitter 18 is determined to be more than a predetermined distance. The alert means alerts the user of the receiver to the fact that the predetermined distance has been exceeded. The receiver may have means to clip the receiver to a users clothes. The receiver could be a dedicated receiver, or an existing device could be modified to act as a suitable receiver, for example a mobile phone. The receiver and transmitter operate at 433 MHz to provide the alert. In an alternative embodiment a blue tooth device is used which transmits a signal to a mobile phone to indicate loss.

The alert means may provide a signal which is detectable by the user in at least one of a vibrating alert, audible or visual alert. The visual alert may include a date and time stamp which indicates when the predetermined distance was exceeded. The alert may be variable enabling an increase in intensity.

The transmitter 18 can take many forms, for example it may be attached to the shield using an adhesive or other fixing method. It could be fixed on the exterior, for example, alongside one edge of the shield, or could be inserted into a hole cut through the shield; this latter option enabling the overall thickness of the shield to be kept to a minimum. The transmitter could be provided on a clamp which is fixed to the shield, the clamp providing means to attach the shield and proximity alert device to a document to be shielded, for example a passport.

In a second embodiment of shield, the shield 2 is in the form of a boarding pass. The outer surface of the shield is provided with a re-printable layer 16, such as a re-printable thermoplastics layer, which enables boarding details to be printed on the shield during, for example, check-in. The shield can then be used to prevent unauthorised reading of, for example, a passport containing biometric data as described above, when boarding the shield 2 is simply presented in the usual manner.

The transmitter 18 is provided with an identification means in the form of the coupling signal having unique frequency or code embedded therein that it transmits which enables it to be uniquely matched to its paired transmitter.

The boarding card issue means is provided (not illustrated) with means to record the identification means of a particular shield transmitter and pair it with the boarding card issued.

The airport is provided with a network of receivers adapted to track the identification means of paired issued boarding cards. This enables the location of a particular boarding card for example, the location of a lost boarding card or the location of a passenger who has not boarded the airplane. The advantage of this is that it reduces potential delays in the take off of the plane because a missing passenger can be swiftly located and brought to the plane more quickly than simply using a tannoy system, with the possibility that the passenger cannot hear or cannot understand. The location of the missing passenger also helps to prevent delays and expense, in that for security reasons it is necessary to locate and remove any check-in baggage from the plane, if the missing passenger is not found, at least within a certain period of time.

By making the shield re-printable, it is possible to reuse the shield as a boarding card on other occasions. However, it is to be understood that the boarding card could be printed for single use and include a transmitter which simply allows the location of the boarding pass within the airport.

The pairing of the identification means also enables additional data to be stored regarding the owner of the shield, for example, frequent flyer information enabling privileges, such as access to executive lounges, discounts or upgrade to travel arrangements. To this end the shield could be provided with memory means 22, such as a RAM (random access memory) which is readable and writable through the shield.

This information may be stored on the airport's check-in system and then utilized in the normal manner, or means could be provided on the shield to store such data.

Although a boarding pass for a plane has been described, other types of travel or security passes are envisaged whereby a visitor or traveller can be tracked and located as required.

Examples include, but not restricted to frequent flier cards, ID documents used in banks for personal identification purposes and security passes.

The shield could be used to protect from skimming a Near Field Communication (NFC) enabled device, such as a mobile phone. The NFC employs a set of short-range wireless technologies, typically with a reading distance of 4 cm and generally operates at a frequency of 13.56 $MH_z$ and the data on the device is read as described above using a reading device.

Although a frequency of 13.56 $MH_z$ has been described it is to be understood that the shield could be adapted to block other frequencies as required in order to prevent remote skimming of data, the blocked frequency being adapted to the reading/activation frequency of the chip that is to be shielded.

The invention claimed is:

1. A shield for a passive device and a receiver remotely coupled to the shield, the shield being adapted to provide radio frequency shielding to block selected radio frequencies, the shield further comprising a transmitter to send a coupling signal to the receiver, the coupling signal being of at least one non-blocked frequency, the receiver having means to monitor the distance between the receiver and transmitter and an alert means to indicate when the measured distance exceeds a predetermined value.

2. A shield according to claim 1, wherein the shield is adapted to be selectively removable from a passive device it shields.

3. A shield according to claim 1 wherein at least one of the transmitter or receiver has means to adjust the predetermined value, the transmitter has means to act as a locating device to search for the shield and provide an alert signal when in range, and the receiver has means to selectively deactivate the coupling.

4. A shield according to claim 1, wherein the alert means comprises an indication of at least one of time and date that the predetermined distance was exceeded, and means to indicate the last time the shield and receiver were paired.

5. A shield according to claim 1, wherein the receiver has means to search for the shield in order to pair the receiver with the transmitter, the receiver having additional means to activate the alert means if the transmitter cannot be found.

6. A shield according to claim 1, wherein the alert means comprises at least one of a vibrating alert, a sound alert, a visual alert, an alert that increases in pitch and intensity.

7. A shield according to claim 1, wherein the shield is provided with a stiffner, at least in the vicinity of the transmitter, wherein the stiffner is in the form of a coating to the shield, the coating being in the form of at least one laminated surface.

8. A shield according to claim 1, wherein the shield provides the shielding by the provision of a shielding layer, the shield having a further thin surface provided on the shielding layer, the further thin layer enabling the provision of printed messages on the shield.

9. A shield according to claim 1, wherein the predetermined value is between 3 to 100 meters.

10. A shield according to claim 1, wherein the receiver is incorporated in a mobile phone.

11. A shield according to claim 1, wherein the receiver has means to detect signals from a plurality of coupled transmitters.

12. A shield according to claim 1, wherein the coupling signal is in the form of at least one of the radio frequency signal, a blue tooth signal, low-powered blue tooth signal and Wi-Fi signal.

13. A shield according to claim 1, wherein the receiver has means to indicate the presence of the transmitter when in range, thereby ensuring the user that the device is working properly.

14. A shield according to claim 1, wherein the shield has means to enable information to be stored thereon, the information means being in the form of at least one of a printable layer, a re-printable layer, thermoplastics layer, writable memory, and rewritable memory.

15. A shield according to claim 1, wherein a further receiver is provided adapted to read the coupling signal of the transmitter and which enables identification of the shield, wherein the further receiver has means to link the transmitter whose coupling signal it reads to an identification pass and means to provide details of that pass to the shield.

16. A shield according to claim 1, wherein plurality of further receivers are provided which are linked in a network and have means to track the location of the shield, wherein the network of receivers has means to enable at least one of the identification and tracking of a plurality of different shield transmitters, and has means to activate the tracking and location of a particular shield transmitter, and wherein the activation means is activated when a particular shield has not been presented for inspection within a set period of time.

17. A shield according to claim 1, wherein the shield has fastening means to selectively attach it to a device incorporating a passive chip the fastening means being in the form of at least one of a shield being incorporated on a band which is adapted to wrap around and retain a plurality of items to be shielded or a clamp which enables the shield to be clipped to a device.

18. A shield according to claim 1, wherein the shield is incorporable in at least one of the following a bag, wallet, purse, item of clothing, document, book and passport.

19. A shield according to claim 1, wherein the shield comprises a shield of sheet material and incorporates a shielding layer having a maximum thickness of 0.4 mm and being constructed of a material adapted to provide radio frequency shielding with an attenuation of at least 50 dB.

20. A shield according to claim 1, wherein the shield is specifically adapted to shield frequencies of 13.56 MHz.

* * * * *

UNITED STATES PATENT AND TRADEMARK OFFICE
CERTIFICATE OF CORRECTION

| | | |
|---|---|---|
| PATENT NO. | : 8,947,227 B2 | Page 1 of 1 |
| APPLICATION NO. | : 13/639353 | |
| DATED | : February 3, 2015 | |
| INVENTOR(S) | : Andre Kay | |

It is certified that error appears in the above-identified patent and that said Letters Patent is hereby corrected as shown below:

On the Title page item (57):

The Abstract should be replaced in it's entirety and read as follows

--A passive device shield 2 used to protect a passive chip containing data embedded in a device from remote skimming at a frequency which activates the chip to send the data, the shield 2 being removable to enable authorized reading of the chip data. The shield 2 is adapted to block the frequencies which activate the chip, the shield 2 further having a transmitter 18 which sends a coupling signal at a non-blocked frequency to a receiver 20, at least one of the receiver/and transmitter 18 having means to monitor the distance between the transmitter 18 and receiver 20 and an alert means to indicate when a predetermined distance has been exceeded.--

Signed and Sealed this
Twenty-sixth Day of May, 2015

Michelle K. Lee
*Director of the United States Patent and Trademark Office*